(12) United States Patent
Hallen

(10) Patent No.: US 7,320,262 B2
(45) Date of Patent: Jan. 22, 2008

(54) TENSIONER

(75) Inventor: Juergen Hallen, Aachen (DE)

(73) Assignee: The Gates Corporation, Denver, CO (US)

( * ) Notice: Subject to any disclaimer, the term of this patent is extended or adjusted under 35 U.S.C. 154(b) by 56 days.

(21) Appl. No.: 11/448,432

(22) Filed: Jun. 7, 2006

(65) Prior Publication Data
US 2007/0099737 A1 May 3, 2007

Related U.S. Application Data

(63) Continuation-in-part of application No. 11/265,868, filed on Nov. 3, 2005, now Pat. No. 7,217,207.

(51) Int. Cl.
*F16H 7/08* (2006.01)

(52) U.S. Cl. .................................................. 74/113

(58) Field of Classification Search ............... 474/101, 474/109, 110, 113, 133, 135
See application file for complete search history.

(56) References Cited

U.S. PATENT DOCUMENTS

| | | | | |
|---|---|---|---|---|
| 2,337,591 | A * | 12/1943 | Coulson | 474/112 |
| 2,575,313 | A * | 11/1951 | Covert et al. | 474/110 |
| 4,464,146 | A * | 8/1984 | Arthur | 474/133 |
| 4,634,407 | A | 1/1987 | Holtz | 474/112 |
| 4,808,148 | A | 2/1989 | Holtz | 474/112 |
| 4,917,655 | A * | 4/1990 | Martin | 474/112 |
| 6,422,962 | B1 * | 7/2002 | Lehtovaara et al. | 474/101 |
| 7,217,207 | B1 * | 5/2007 | Hallen | 474/135 |

FOREIGN PATENT DOCUMENTS

WO  WO 87/01166  2/1987

* cited by examiner

*Primary Examiner*—Vicky A. Johnson
(74) *Attorney, Agent, or Firm*—J. A. Thurnau, Esq.; C. H. Castleman, Esq.; J. L. Mahurin, Esq.

(57) ABSTRACT

A tensioner comprising a base having a toothed portion, a pivot arm pivotally engaged with the base, a pulley journalled to the pivot arm, a spring disposed between the base and the pivot arm for biasing the pivot arm in a first direction, a mechanism disposed on the pivot arm and engaged with the base, the mechanism comprising a rotatable geared member and a second spring engaged between the geared member and the pivot arm, the second spring biasing the pivot arm in the first direction, and the geared member having a non-toothed portion that when the non-toothed portion is engaged with the toothed portion it prevents substantial rotation of the pivot arm in a reverse direction from the first direction.

2 Claims, 11 Drawing Sheets

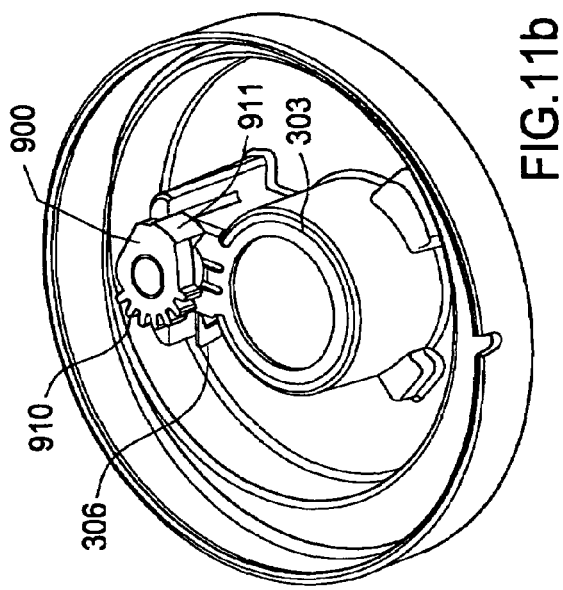
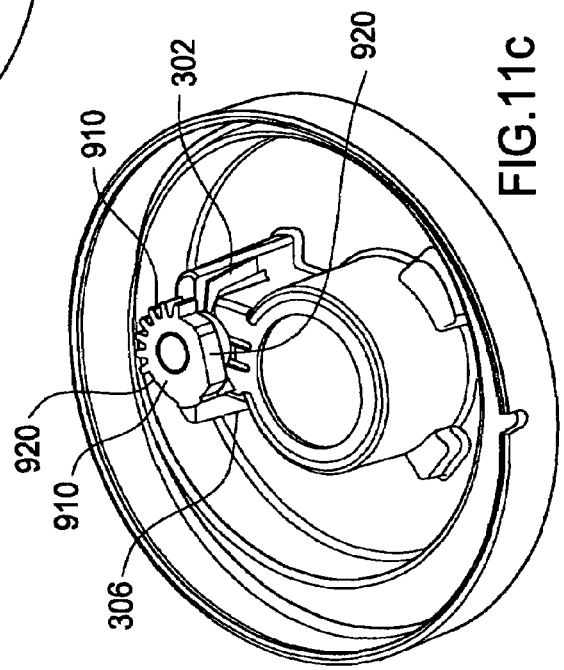
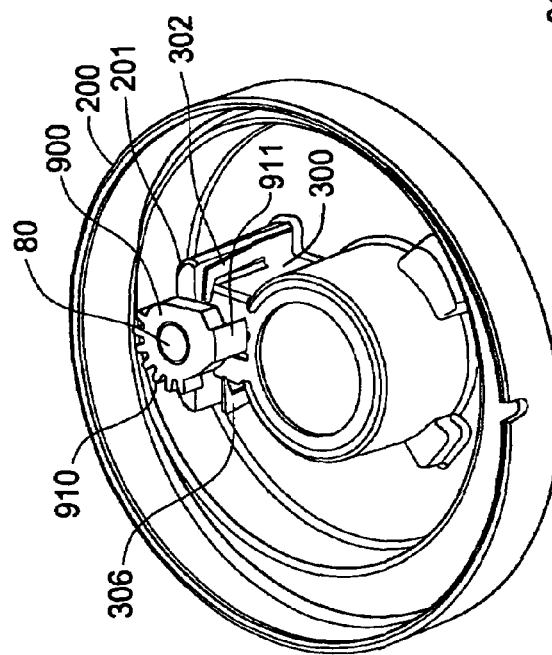

TENSIONER

RELATED APPLICATIONS

This application is a continuation-in-part of and claims priority from U.S. non-provisional application Ser. No. 11/265,868 filed Nov. 3, 2005 now U.S. Pat. No. 7,217,207.

FIELD OF THE INVENTION

The invention relates to a tensioner, and more particularly, to a tensioner having a relocking stop mechanism that upon release allows the pivot arm to move from an installation position to an optimum operating position, which stop mechanism also prevents the pivot arm from moving in a reverse direction beyond a predetermined range during load reversals in a belt drive system, which relocking stop mechanism can be relocked to the installation position for belt replacement.

BACKGROUND OF THE INVENTION

Eccentric tensioners are used to apply a load to power transmission belts, which includes synchronous belts or toothed belts. For example, toothed belts are used on engine cam drives for power transmission and timing purposes. A tensioner is used to apply a proper belt load which in turn assures proper operation of the belt drive system of which the tensioner and belt are a part.

Such tensioners generally comprise a torsion spring and an eccentric pivot arm which creates a lever arm to apply a spring load to the belt.

During the operating life of an engine a toothed belt will slightly change length due to wear and other factors. This condition must be accommodated by the tensioner.

In addition, during load reversals, for example during engine deceleration, the tensioner must be able to prevent the belt from becoming unduly slack which can lead to a condition called "ratcheting" where the belt can "jump" across the teeth of sprockets in the system. This can lead to catastrophic changes in the engine timing and premature failure of the belt.

Ratchet and pawl systems are used to prevent tensioner pivot arms from excessive recoil during load reversals. Once released the ratchet and pawl systems cannot be relocked.

Representative of the art is U.S. Pat. No. 4,808,148 (1989) to Holtz which discloses a belt tensioning device includes a resilient coupling which interconnects an idler pulley hub and a stationary mounting member. A ratchet and pawl mechanism interconnects the hub and the stationary mounting member to prevent the belt from overcoming the biasing force of the tensioning device during high belt loads. A resilient biasing element such as an elastomeric element is located between the ratchet and pawl mechanism and the stationary mounting member to allow limited movement of the idler pulley hub away from a belt in order to relieve belt tension such as caused during thermal expansion of an engine block.

What is needed is a tensioner having a relocking stop mechanism that upon release allows the pivot arm to move from an installation position to an optimum operating position, which stop mechanism also prevents the pivot arm from moving in a reverse direction beyond a predetermined range during load reversals in a belt drive system, which relocking stop mechanism can be relocked to the installation position for belt replacement. The present invention meets this need.

SUMMARY OF THE INVENTION

The primary aspect of the invention is to provide a tensioner having a stop mechanism that upon release allows the pivot arm to move from an installation position to an optimum operating position, which stop mechanism also prevents the pivot arm from moving in a reverse direction beyond a predetermined range during load reversals in a belt drive system, which relocking stop mechanism can be relocked to the installation position for belt replacement.

Other aspects of the invention will be pointed out or made obvious by the following description of the invention and the accompanying drawings.

The invention comprises a tensioner comprising a base having a toothed portion, a pivot arm pivotally engaged with the base, a pulley journalled to the pivot arm, a spring disposed between the base and the pivot arm for biasing the pivot arm in a first direction, a mechanism disposed on the pivot arm and engaged with the base, the mechanism comprising a rotatable geared member and a second spring engaged between the geared member and the pivot arm, the second spring biasing the pivot arm in the first direction, and the geared member having a non-toothed portion that when the non-toothed portion is engaged with the toothed portion it prevents substantial rotation of the pivot arm in a reverse direction from the first direction.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIGS. 11(a) and 11(b) and 11(c) are each perspective views of the pivot arm 200.

DETAILED DESCRIPTION OF THE PREFERRED EMBODIMENT

Figure 1:
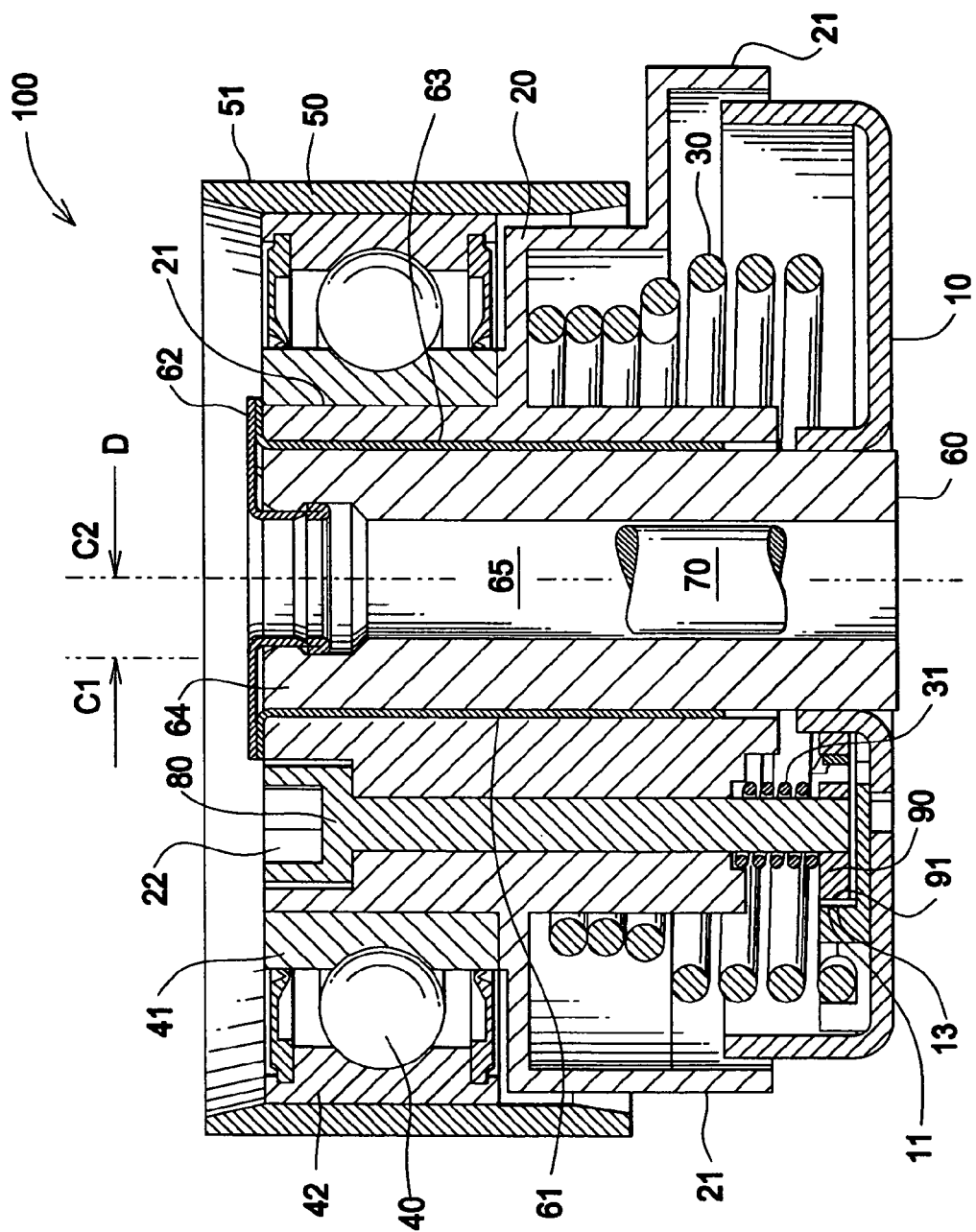
FIG. 1 is a cross-sectional view of the tensioner.

FIG. 1 is a cross-sectional view of the tensioner. Tensioner comprises base 10 connected to a sleeve 60. A fastener may be disposed within and project through hole 65 in sleeve 60. A fastener is used to connect tensioner 100 to a mounting surface, for example, an engine block surface. In this embodiment fastener 70 comprises a bolt.

Pivot arm 20 is pivotally engaged about an outer surface 61 of bearing 63. Bearing 63 is disposed between sleeve 60 and pivot arm 20. Bearing 63 comprises a low friction material such as nylon of PTFE. Sealing disc 62 situated on a top end 64 of sleeve 60 prevents debris from entering between sleeve 60, bearing 63 and pivot arm 20. Flange 21 extends around the base of the pivot arm 20 to overlap base 10 thereby preventing debris from entering the tensioner.

A torsion spring 30 is engaged between the base 10 and the pivot arm 20. Torsion spring 30 biases pivot arm 20 in a predetermined direction in order to properly apply a spring load a belt (not shown), such as may be used in a belt drive system.

Pulley 50 is rotationally engaged to pivot arm 20 through bearing 40. Bearing 40 comprises a ball bearing in this embodiment. Bearing 40 comprises an inner race 41 and an outer race 42. Inner race 41 is engaged with surface 21 of pivot arm 20. Outer race 42 is engaged with the pulley 50.

Belt bearing surface 51 is flat for engaging a belt (not shown). An axis of rotation (C2) of the pulley 50 is eccentrically offset a distance (D) from the axis of rotation (C1) of the pivot arm 20.

Post 80 is inserted through pivot arm 20. Post 80 is aligned parallel with the axis of rotation C2 of the pivot arm. Post 80 may be allowed to rotate. Further, it moves in an arc as pivot arm 20 pivots about sleeve 60. Geared member 90 is connected to an end of post 80 so that when post 80 is turned geared member 90 turns as well. Post 80 may be turned by use of a hexagonal socket inserted in receiving portion 22.

Geared member 90 comprises a toothed portion 91. Toothed portion 91 comprises teeth having a gear pattern along an outer edge of geared member 90.

Base 10 comprises a toothed portion 11 disposed along an inner surface of portion 13. Toothed portion 11 extends a predetermined distance on portion 13.

Torsion spring 31 is engaged between pivot arm 20 and geared member 90. Torsion spring 31 biases gear member 90 in a predetermined direction to facilitate engagement of toothed portion 91 with toothed portion 11. Spring 31 also contributes to the tensioner spring load imparted to a belt by the tensioner.

Figure 2:
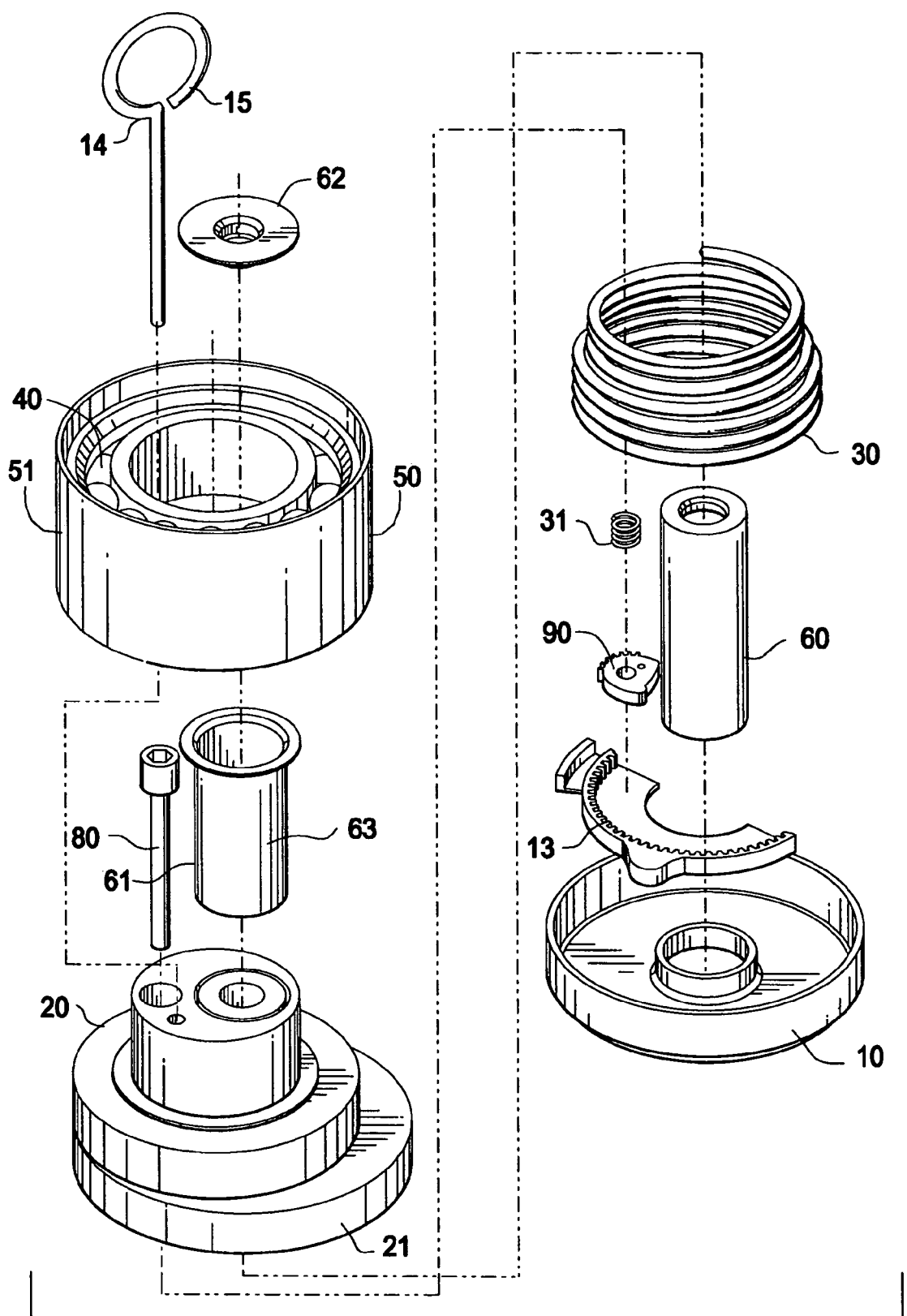
FIG. 2 is an exploded view of the tensioner.

FIG. 2 is an exploded view of the tensioner. Post 80 is engaged with pivot arm 20. Geared member 90 is rotationally engaged to an end of post 80. Portion 13 is connected to base 10.

Pin 14 is engaged with pivot arm 20. Pin 14 projects through pivot arm 20 to engage geared member 90. Pin 14 comprises a removable member that is used to temporarily fix an installation position of the pivot arm with respect to the base. After the tensioner is installed, pin 14 is removed from the pivot arm by pulling on end 15. Removal of pin 14 allows pivot arm to move to an operating position. Movement of pivot arm 20 also causes geared member 90 to move in an arc with the pivot arm 20.

Figure 3:
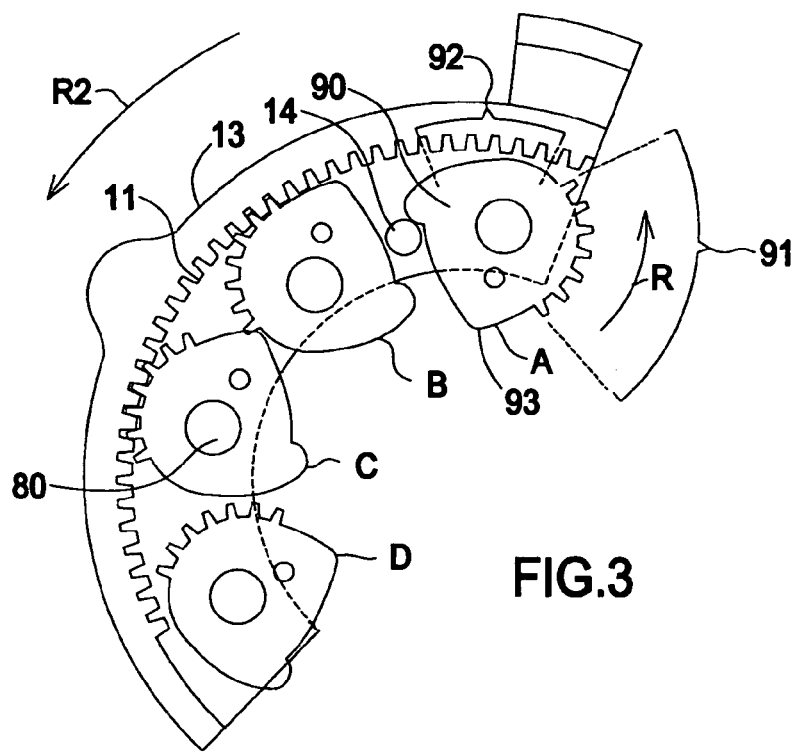
FIG. 3 is plan view detail of the stop mechanism.

FIG. 3 is plan view detail of the stop mechanism. Portion 13 comprises toothed portion 11. Toothed portion 11 has an arcuate shape and is disposed along an inner surface of portion 13.

Geared member 90 comprises a toothed portion 91 and a non-toothed portion 92. Toothed portion 91 has an arcuate shape and extends along an outer circumferential portion of geared member 90. The remaining portion of geared member 90 does not have any teeth. The toothed portion 91 extends through an arc of approximately 90°.

Position "a" shows the geared member 90 in the installation position. In the "a" position pin 14 is engaged with the pivot arm 20 and geared member 90 as described for FIG. 2. The non-toothed portion 92 is oriented toward toothed portion 11. Namely, pin 14 temporarily fixes a geared member 90 position with respect to the toothed portion 11.

When pin 14 is removed two events occur. First, this allows geared member 90 to rotate in direction "R" by operation of torsion spring 31. However, geared member 90 only rotates so far as to allow toothed portion 91 to come into contact with toothed portion 11. Second, pivot arm 20 is free to pivot in direction R2, thereby causing post 80 to move in an arc. Movement of the pivot arm causes the tensioner to load a belt (not shown). Hence, pin 14 temporarily fixes the position of the pivot arm with respect to the base, and temporarily fixes the position of the geared member 90 with respect to the toothed portion 11, each being in predetermined positions.

Movement of the pivot arm 20 continues so that the geared member 90 moves to the hot operating position. The hot operating position is disposed between "d" and "b" at approximately "c". To move in this manner the toothed portion 91 of geared member 90 ratchets over the toothed portion 11, whereby the automatic reconciliation of the geometrical tolerances in the drive is made possible.

With the start-up of the engine the tensioner takes up its function of applying a constant tension (load) to a belt in a belt drive.

While in this position the geared member 90 is in active contact with the toothed portion 11. This means that the spring rate for spring 31 is contributing to the overall spring rate and operational characteristic of the tensioner being provided by spring 30.

Upon a load reversal in the belt drive system, for example on deceleration of a vehicle, the belt will temporarily become slack, causing a brief interval where the pivot arm 20 will be urged by the torsion spring 30 to move back toward the installation position "a". However, substantial movement of the pivot arm in the reverse direction is prevented by the engagement of portion 92 where there are no teeth, and in particular projection 93, with the toothed position 11 at position "b", thus creating an interference between the geared member 90 and the base 10, which in turn stops rotation of the pivot arm 20. This stops pivotal movement of pivot arm 20 from proceeding any further toward position "a". By stopping pivotal movement of the pivot arm 20 at position "b", the belt is prevented from becoming unnecessarily slack, which might otherwise cause the belt to "ratchet" at a crankshaft sprocket (not shown).

As the belt wears during operation, the tensioner can automatically follow the belt by the "jumping function", between geared member toothed portion 91 and the toothed portion 11, thereby continuously defining a new nominal operating position and range between positions "d" and "b".

Pivot arm 20 can be released from the operating position "c", for example so a belt can be changed, by using a hexagon socket engaged with portion 22 of post 80. Geared member 90 is unscrewed from its interference with the toothed portion 11 to an orientation shown at position "d" by rotation of post 80 using a hexagon socket. Pivot arm 20 can then be allowed to rotate back into the installation position "a", where the post and geared member 90 are allowed to again rotate into position "a". The tensioner is then locked into the installation configuration as the pin 14 is inserted between the pivot arm 20, the geared member 90 and the base 10.

Figure 4:
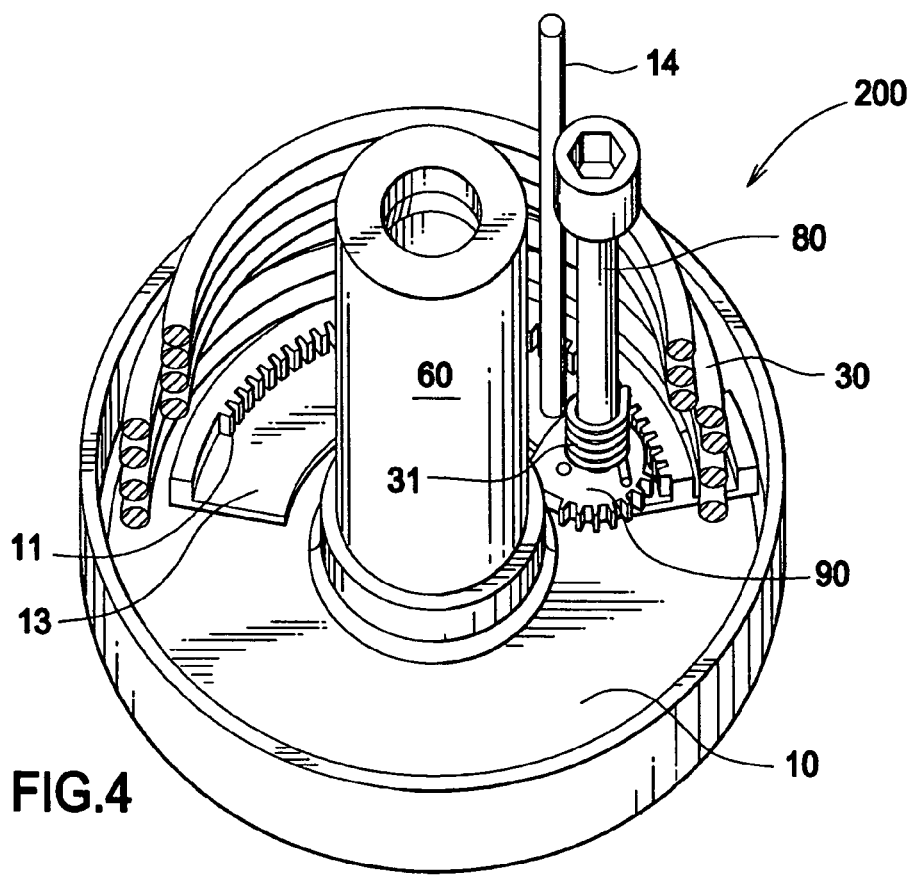
FIG. 4 is a top perspective view of the stop mechanism.

FIG. 4 is a top perspective view of the stop mechanism. Stop mechanism 200 comprises geared member 90, post 80, portion 13 and toothed portion 11. Stop mechanism 200 also comprises torsion spring 31. The stop mechanism is contained within the circumference (diameter) of the torsion spring 30, thereby making the tensioner compact in size.

Pin 14 is used to temporarily fix a geared member 90 position with respect to the toothed portion.

Figure 5:
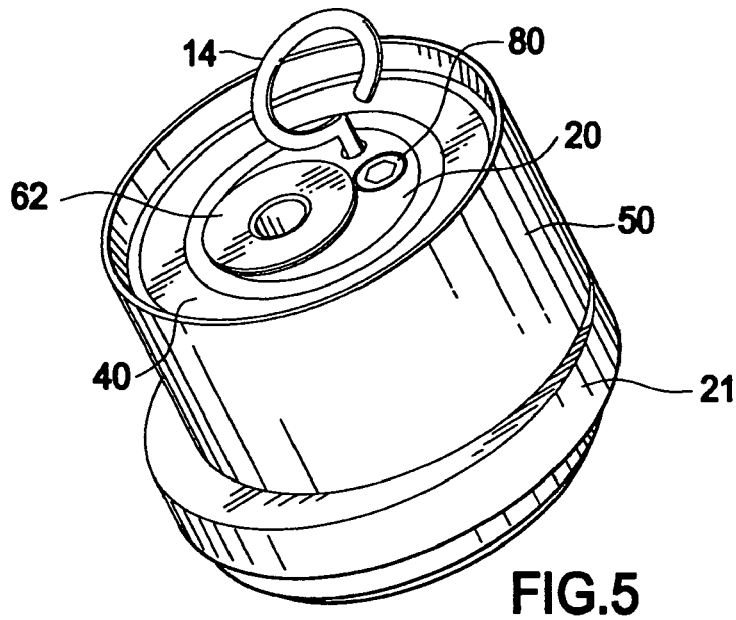
FIG. 5 is a top perspective view of the tensioner.

FIG. 5 is a top perspective view of the tensioner. Pin 14 is shown projecting from the pivot arm 20 in the installation position. Sealing disc 62 prevents debris from entering between the bearing 63 and the pivot arm 20, and between the bearing 63 and the sleeve 60.

Figure 6:
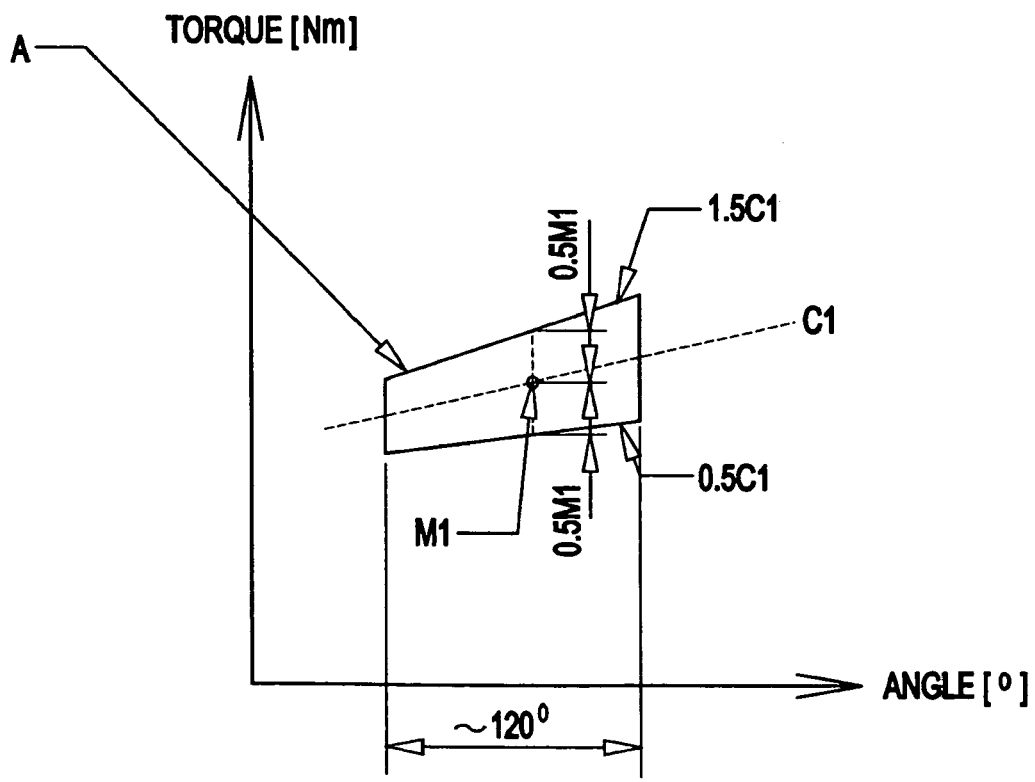
FIG. 6 is a chart showing the hysteretic relationship between the torque and pivot arm angle without including the effects of torsion spring 31.

FIG. 6 is a chart showing the hysteretic relationship between the torque and pivot arm angle without including the effects of torsion spring 31. The chart displays the torque compared to the pivot arm angle only for spring 30 by itself. The curve demonstrates the relatively broad range of motion of the pivot arm (angle) when the only spring in service is spring 30. The equations and variables are set forth for FIG. 8.

Figure 7:
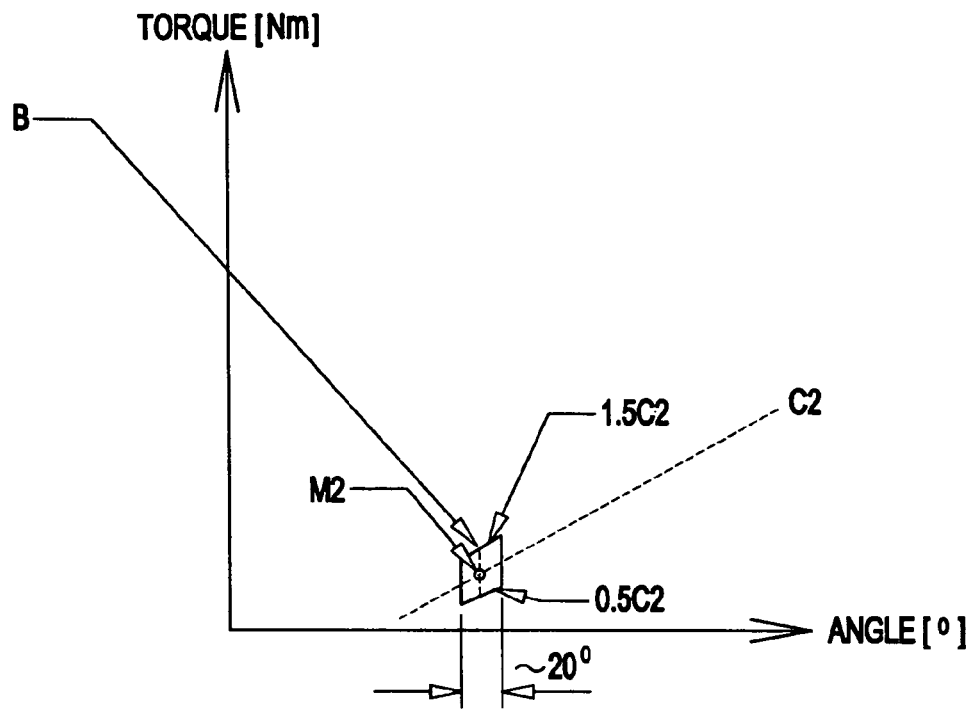
FIG. 7 is a chart showing the hysteretic relationship between the torque and pivot arm angle for torsion spring 31 only without the effect of spring 30.

FIG. 7 is a chart showing the hysteretic relationship between the torque and pivot arm angle for torsion spring 31 only without the effect of spring 30.

Figure 8:
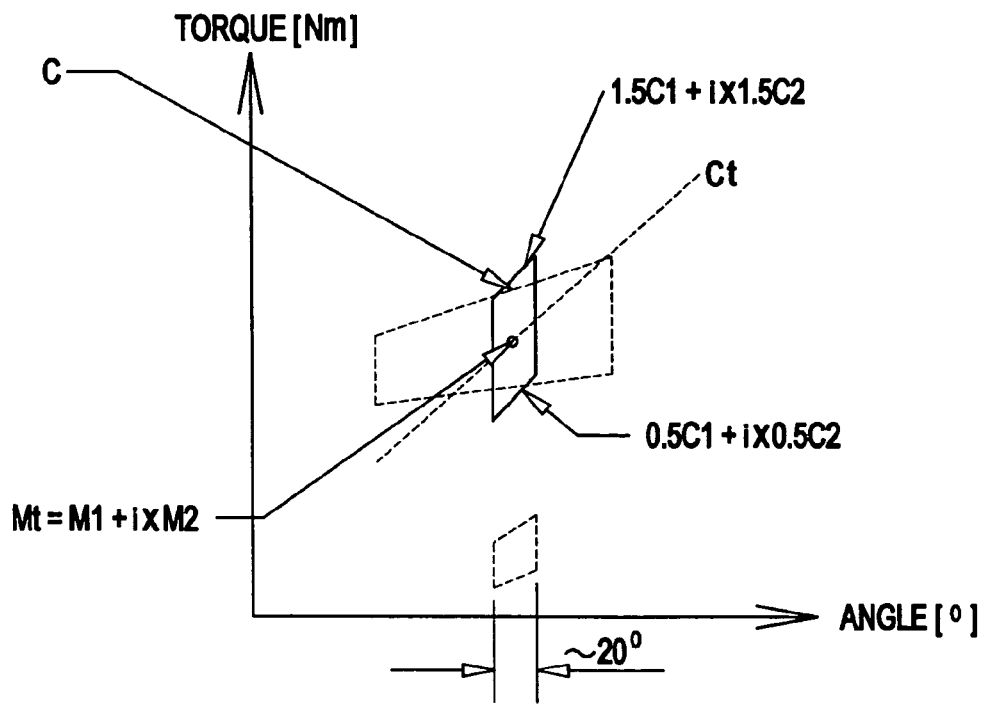
FIG. 8 is a chart showing the hysteretic relationship between the torque and pivot arm angle for the combination of spring 30 and spring 31.

FIG. 8 is a chart showing the hysteretic relationship between the torque and pivot arm angle for the combination of spring 30 and spring 31. The chart displays Curve C which is the torque compared to the pivot arm angle for a tensioner using tensioner spring 30 (Curve A) combined with torsion spring 31 (Curve B). Since geared member 90 is in operational contact with the toothed portion 11 during normal operation of the tensioner, spring 31 contributes a spring force to the belt load applied by spring 30.

Curve A illustrates the relatively broad range of motion of the pivot arm (angle) when the only spring in service is spring 30. Curve B illustrates the relatively narrower range of movement of the pivot arm in the case of operation with the combination of spring 30 and spring 31. The tensioner pivot arm operating range is approximately 30° to approximately 150°, which is the total range of pivot arm movement as compared to the position in which the pivot arm is at a minimum spring load, namely, engaged against a stop. Once the tensioner is in operation and the pulley 50 is engaged with a belt in a belt drive system, the pivot arm operating range of movement within the larger envelop noted above (30° to 150°) is approximately 20° to approximately 40°. The torque generated by the combined force of spring 30 and spring 31 gives substantially the same torque as the tensioner using only spring 30, only over a narrower angular range of down to approximately 20°.

Following is an example case for the purpose of illustration but not for the purpose of limiting the scope of the invention.

Index notation "1" refers to spring 30.
Index notation "2" refers to spring 31.
Index notation "t" refers to the combination of spring 30 and spring 31.

"C" is spring rate.
"M" is nominal torque.
"i" is the transmission ratio which is the theoretical number of rotations of toothed portion 91 for each full 360° rotation of pivot arm 20.

Spring Rate Range (spring 30)=approximately 0.02 Nm/degree to approximately 0.1 Nm/degree Spring Rate Range (spring 31)=approximately 0.001 Nm/degree to approximately 0.06 Nm/degree Transmission ratio "i"=approximately 3:1 to approximately 5:1

Example Calculation:

Nominal Torque "M" for the pivot arm for each spring 30, 31.

$$M_1 = 1.7 \text{ Nm} \qquad \text{(FIG. 6)}$$

The range for $M_1$ in FIG. 6 is approximately $\pm 0.5 * M_1$ $$M_2 = 0.15 \text{ Nm} \qquad \text{(FIG. 7)}$$

The range for $M_2$ in FIG. 7 is approximately $\pm 0.5 * M_2$ $$i = 4:1$$

$$M_t = M_1 + i * M_2 \qquad \text{(FIG. 8)}$$

$$M_t = 2.3 \text{ Nm} \qquad \text{(FIG. 8)}$$

The range for $M_t$ in FIG. 8 is approximately $\pm 0.5 * M_t$

Upper Curve, FIG. 8

$$C_{1u} = \text{Spring rate(spring 30)} = C_1 = 0.054 \text{ Nm/degree}$$

$$C_{2u} = \text{Spring rate(spring 31)} = C_2 = 0.0058 \text{ Nm/degree}$$

$$C_{1u} = 1.5 * C_1$$

$$C_{1u} = 0.081 \text{ Nm/degree}$$

$$C_{2u} = 1.5 * C_2$$

$$C_{2u} = 0.0087 \text{ Nm/degree}$$

$$C_{tu} = 1.5 * C_{1u} + i * 1.5 * C_{2u} \qquad \text{(Upper Curve)}$$

$$C_{tu} = 0.081 \text{ Nm/degree} + 4 * 0.0087 \text{ Nm/degree}$$

$$C_{tu} = 0.1158 \text{ Nm/degree}$$

Lower Curve, FIG. 8

$$C_{1d} = \text{Spring rate(spring 30)}; C_1 = 0.054 \text{ Nm/degree}$$

$$C_{2d} = \text{Spring rate(spring 31)}; C_2 = 0.0058 \text{ Nm/degree}$$

$$C_{1d} = 0.5 * C_1$$

$$C_{1d} = 0.027 \text{ Nm/degree}$$

$$C_{2d} = 0.5 * C_2$$

$$C_{2d} = 0.0029 \text{ Nm/degree}$$

$$C_{td} = 0.5 * C_{1u} + i * 0.5 * C_{2u} \qquad \text{(Lower Curve)}$$

$$C_{td} = 0.027 \text{ Nm/degree} + 4 * 0.0029 \text{ Nm/degree}$$

$$C_{td} = 0.0386 \text{ Nm/degree}$$

The use of two springs as described allows the characteristic of the tensioner to be fine tuned to particular applications. For example, the spring rate of each spring can be selected to enhance the damping ability of the tensioner, thereby reducing the magnitude of movement "spikes" in the overall range of movement of the tensioner.

Figure 9:
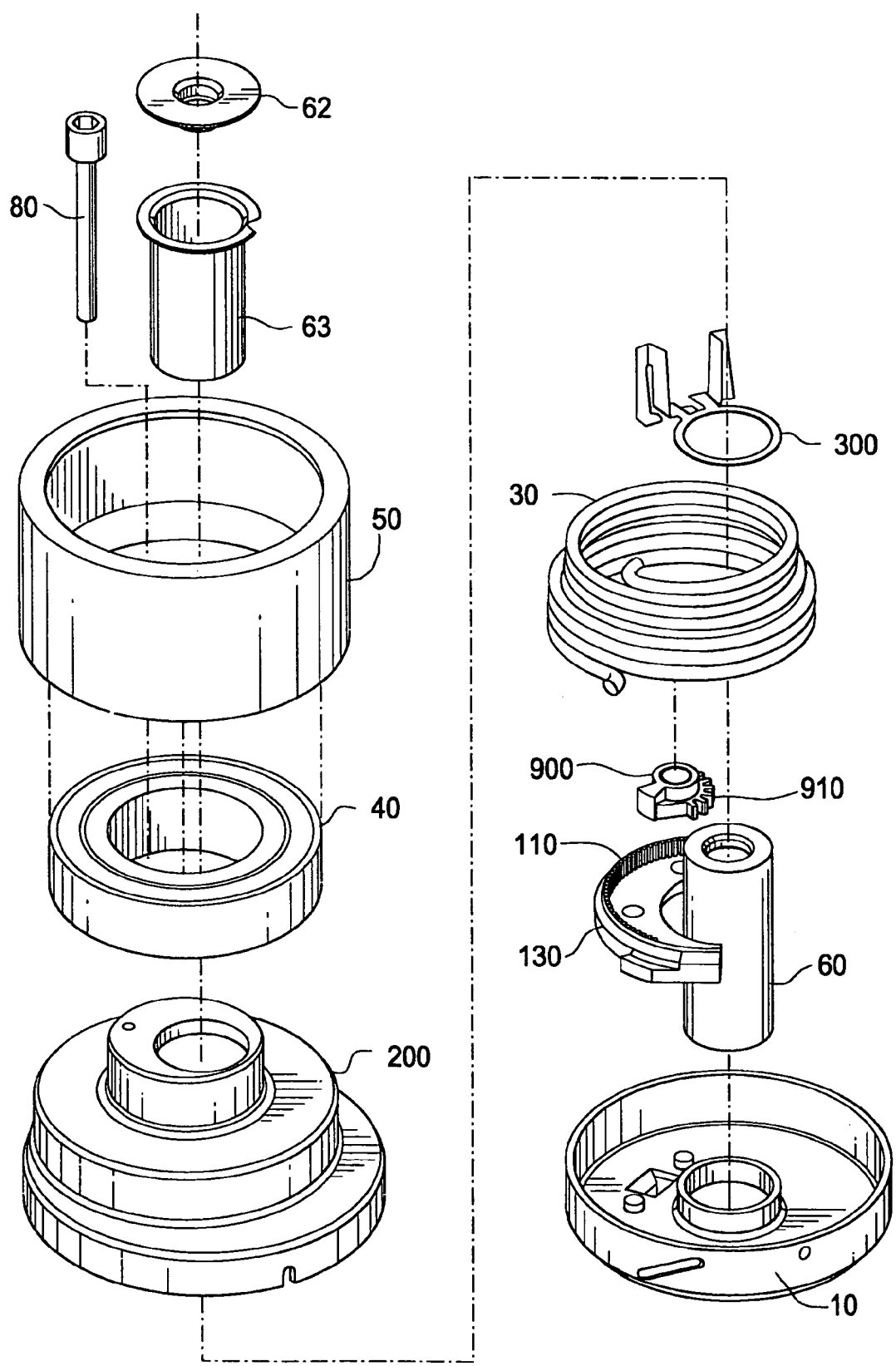
FIG. 9 is an exploded view of an alternate embodiment.

FIG. 9 is an exploded view of an alternate embodiment. This alternate embodiment is as described in FIGS. 1-8 with the following exceptions.

Portion 130 comprises toothed portion 110. Toothed portion 110 has an arcuate shape and is disposed along an inner surface of portion 130, see FIG. 12.

Geared member 900 comprises a toothed portion 910 and a non-toothed portion 920, see FIG. 11. Toothed portion 910 has an arcuate shape and extends along an outer circumferential portion of geared member 900. The remaining portion of geared member 900 does not have any teeth. The toothed portion 910 extends through an arc of approximately 90°.

Geared member 900 is connected to an end of post 80. Gear spring 300 is engaged with pivot arm 200.

Pivot arm 200 is rotatably engaged with sleeve 60 and thereby with base 10. Spring 30 is engaged between pivot arm 200 and base 10.

Figure 10:
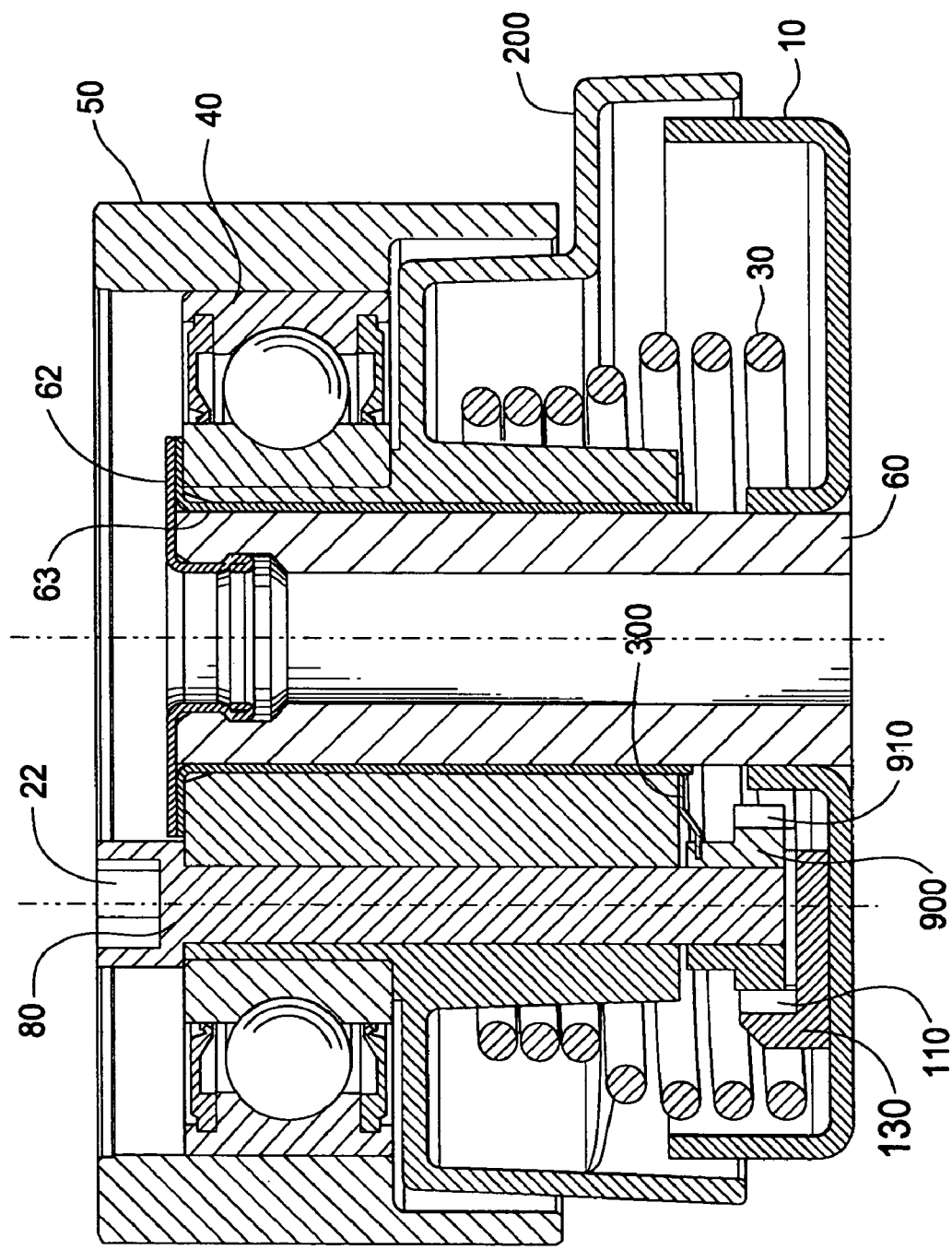
FIG. 10 is a cross-sectional view of the alternate embodiment in FIG. 9.

FIG. 10 is a cross-sectional view of the alternate embodiment in FIG. 9. Spring 300 is engaged with geared member 900. Geared member 900 engages portion 130.

FIGS. 11(a) and 11(b) and 11(c) are each perspective views of the pivot arm 200. In FIG. 11(a) geared member 900 is connected to an end of post 80. Portion 303 of spring 300 encircles sleeve 60 in order to keep spring 300 in the proper location. Tang 305 and 304 (see FIG. 14) engages pivot arm 200 to keep spring 300 in the proper location. Tang 305 extends from spring 300 to engage geared member 900. Tang 301 engages and thereby exerts an axial force upon geared member 90 and thereby upon post 80. Cantilever tangs 302 and 306 each extend on substantially opposing sides to engage geared member 900. In FIG. 11(b) geared member 900 is shown rotated counterclockwise from FIG. 11(a), thereby causing protrusion 911 to engage tang 302. Cantilever tang 302 exerts a spring force on protrusion 911 to urge geared member 900 to rotate in a clockwise direction. In FIG. 11(c) geared member 900 is shown rotated clockwise from FIG. 11(a) thereby causing protrusion 912 (not shown) is engaged with tang 306. Cantilever tang 306 exerts a spring force on protrusion 912 to urge geared member 900 to rotate in a counterclockwise direction.

Rotation of geared member 900 will cause toothed portion 910 to either engage or disengage toothed portion 110 depending upon the relationship of toothed portion 910 to toothed portion 110. Geared portion 900 may be rotated by use of a tool engaged with receiving portion 22 as well.

Figure 12:
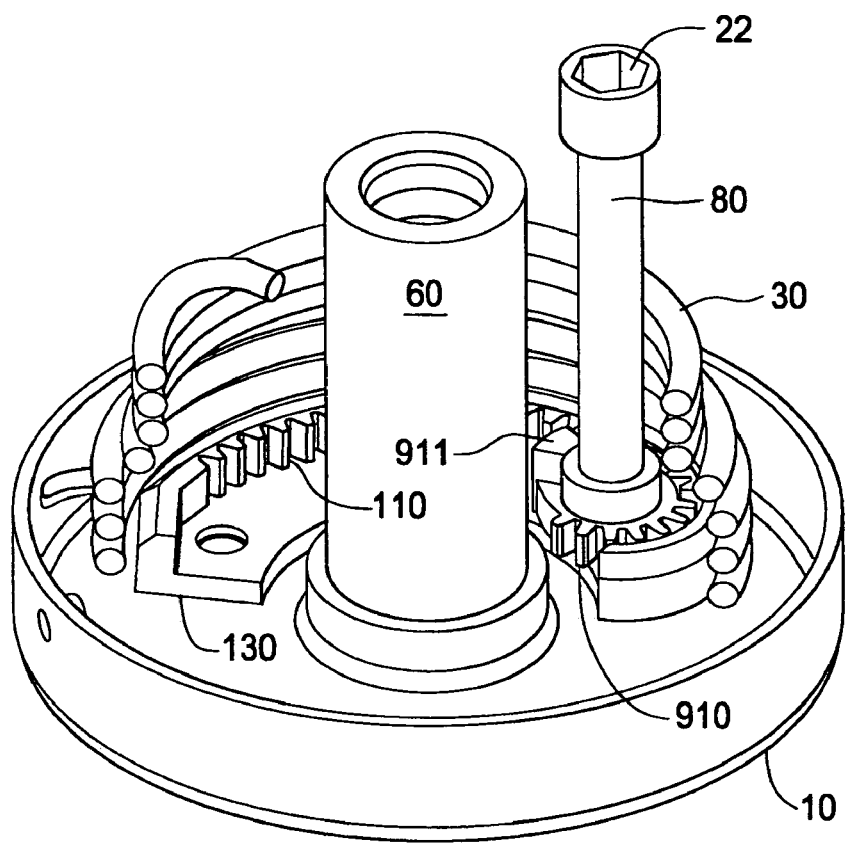
FIG. 12 is a perspective view of the base with components.

FIG. 12 is a perspective view of the base with components. Toothed portion 910 is engageable with toothed portion 110. As pivot arm 200 pivots about sleeve 60, toothed portion 910 rotates with post 80 and tracks along toothed portion 110. Post 80, and thereby geared member 90, may be turned by use of hexagonal sprocket inserted into receiving portion 22.

Figure 13A:
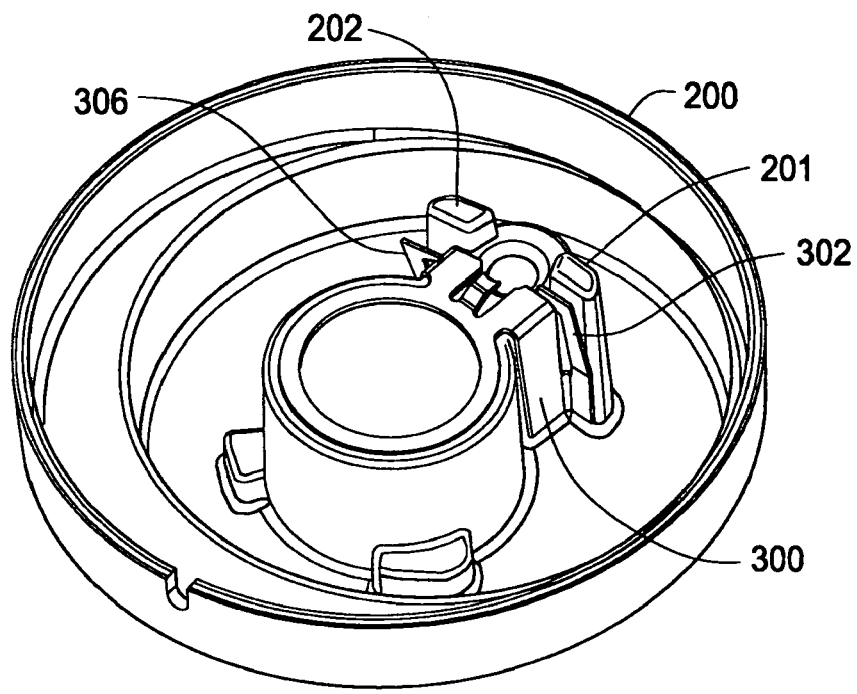
FIG. 13(a) is a right perspective view of the pivot arm.

FIG. 13(a) is a right perspective view of the pivot arm. Spring 300 is engaged with pivot arm 200.

Pivot arm 200 also comprises stops 201 and 202 that are disposed on either side of the position of post 80 and geared member 90. Tang 302 extends to a position that is adjacent stop 201.

Figure 13B:
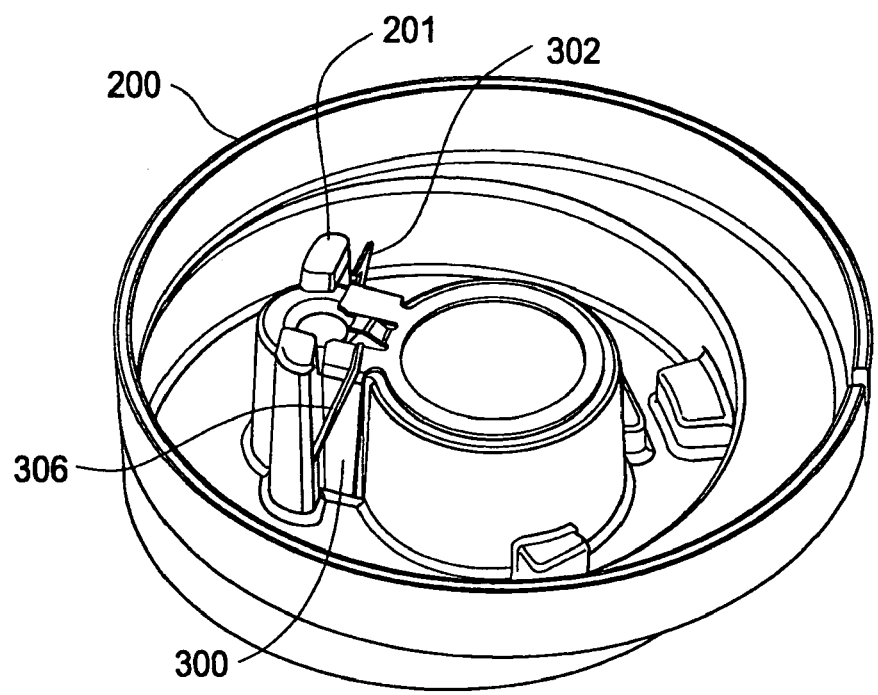
FIG. 13(b) is a left perspective view of the pivot arm.

FIG. 13(b) is a left perspective view of the pivot arm.

Figure 14:
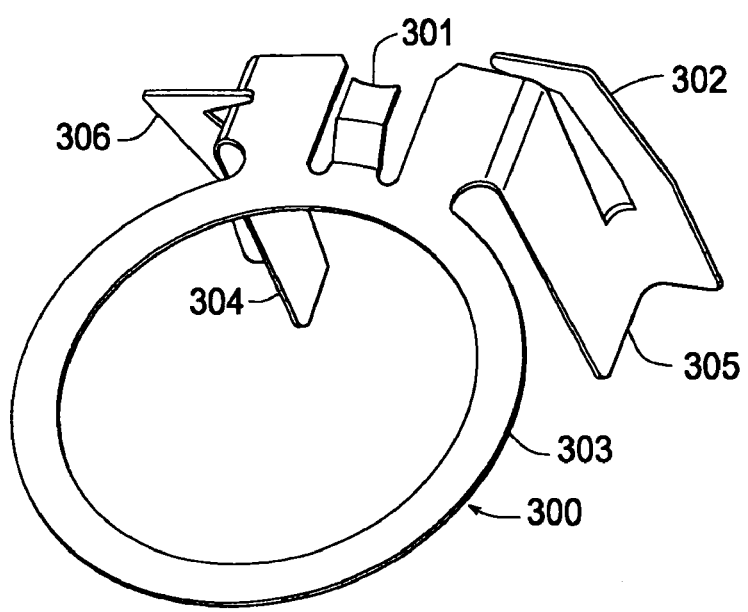
FIG. 14 is a perspective view of the spring.

FIG. 14 is a perspective view of the spring. Portion 303 is substantially circular. It is also substantially flat in order to minimize the space occupied about sleeve 60 between the pivot arm 200 and base 10. Tang 301 projects above the plane of portion 303 to engage geared member 900. Tangs 304 and 305 extend normally from the plane of portion 303.

Tang 306 and tang 302 are each disposed on opposing sides of geared member 900. Tangs 302 and 306 extend cooperatively with tang 301 and in concert therewith to engage geared member 900. Each of tangs 302 and 306 exert a spring force when engaged with geared member 900.

Spring 300 comprises any suitable resilient material including but not limited to plastic or spring steel.

Figure 15:
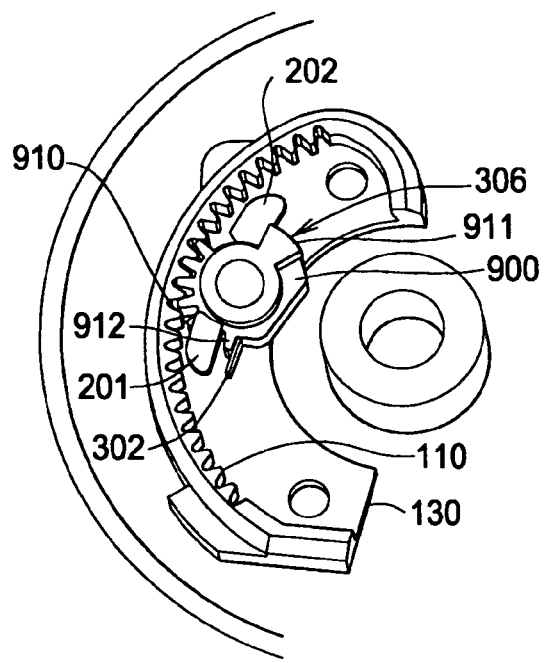
FIG. 15 is a cross-sectional view of the alternate embodiment.

FIG. 15 is a cross-sectional view of the alternate embodiment. Toothed portion 910 of geared member 900 is engaged with toothed portion 110 of portion 130. Protrusion 911 is engageable with stop 202. The plane in which protrusion 911 is disposed renders protrusion 911 engageable with either stop 202 or stop 201 depending upon the direction of rotation of geared member 900.

Extending from an opposing part of geared member 900 is protrusion 912. Protrusion 912 is engageable with tang 302. The plane in which protrusion 912 is disposed is below the plane for protrusion 911 such that protrusion 912 does not come into contact with either stop 201 or 202. FIG. 15 shows protrusion 911 engaged with stop 202 which is the position of maximum rotation of pivot arm 200, and hence the position of maximum torque.

Figure 16:
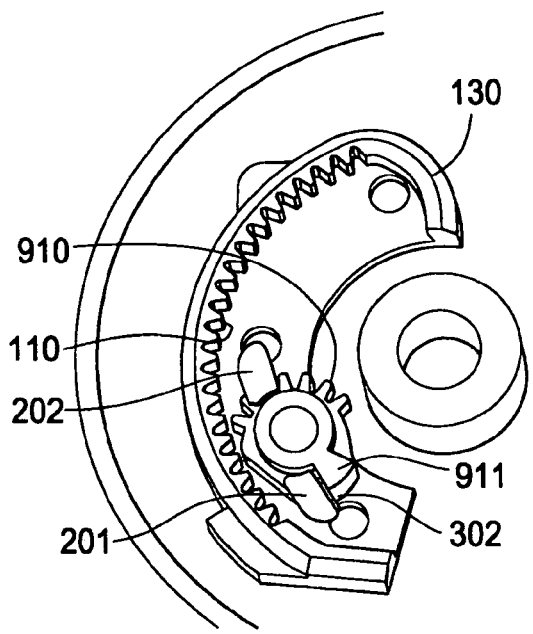
FIG. 16 is a cross-sectional view of the alternate embodiment.

FIG. 16 is a cross-sectional view of the alternate embodiment. In this figure protrusion 911 is engaged with stop 201 and tang 302. Toothed portion 910 is fully disengaged from toothed portion 110. The position of pivot arm 200 may be reset with the geared portion 900 in this position. The position shown in FIG. 16 is with the pivot arm 200 completely unloaded, that is, the pivot arm 200 is not engaged with a belt in an operating condition.

Figure 17:
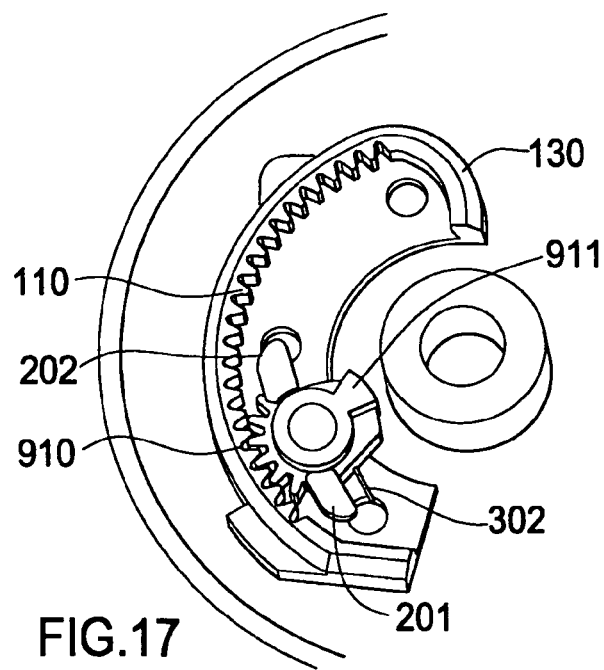
FIG. 17 is a cross-sectional view of the alternate embodiment.

FIG. 17 is a cross-sectional view of the alternate embodiment. Toothed portion 910 is fully engaged with toothed portion 110. Protrusion 911 is disposed between stops 201 and 202 but is not engaged with either. This position can be characterized as the "mean operating position" of the inventive tensioner.

In operation the components are configured as shown in FIG. 16, that is, by rotation of post 80 using a tool engaged with receiving portion 22, geared member 900 is rotated to engage protrusion 911 with stop 201. To then engage and load a belt (not shown) the tool is removed from receiving portion 22 thereby allowing tang 302 to partially rotate geared member 900 so that the toothed portion 910 engages toothed portion 110, see FIG. 17. Removal of the tool and rotation of geared member 900 occurs after the pulley 50 is engaged with a belt, thereby establishing a mean operating position. Tang 301 presses upon geared member 900 thereby resisting rotation of geared member 900 as well as maintaining engagement of geared member 900 with portion 130.

In normal operation, protrusion 911 does not engage stops 201 or 202 instead being dispose between the stops as shown in FIG. 17. However, during belt high load transients where the normal travel range of the pivot arm is temporarily exceeded, protrusion 911 may come into contact with stop 202 as described in FIG. 15, thereby limiting rotation of pivot arm 200 and thereby providing additional torque as needed to control the pivot arm. Belt load transients may be caused by abrupt changes in the engine speed, for example, during rapid deceleration. Once the load transient is passed, pivot arm 200 and geared member 900 returns to the mean operating position per FIG. 17.

Since the geared member 900 may be selectively engaged with toothed portion 110 by rotation of post 80, the operating range of the inventive tensioner is fully adjustable, which includes adjustment of the pivot arm rotation stop position as determined by the engagement of protrusion 911 with stop 201 or 202.

Although a form of the invention has been described herein, it will be obvious to those skilled in the art that variations may be made in the construction and relation of parts without departing from the spirit and scope of the invention described herein.

I claim:

1. A tensioner comprising:
   a base having a toothed portion;
   a pivot arm pivotally engaged with the base;
   a pulley journalled to the pivot arm;
   a spring disposed between the base and the pivot arm for biasing the pivot arm in a first direction;
   a mechanism disposed on the pivot arm and engaged with the base, the mechanism comprising a rotatable geared member and a second cantilever spring engaged between the rotatable geared member and the pivot arm, the second cantilever spring biasing the rotatable geared member from the pivot arm; and
   the rotatable geared member having a second toothed portion that is engageable with the toothed portion;
   a stop disposed on the pivot arm engageable with the rotatable geared member, which stop prevents rotation of the pivot arm beyond a predetermined position.

2. The tensioner as in claim 1 further comprising a second stop disposed to engage the rotatable geared member.

* * * * *